United States Patent
Liao

(10) Patent No.: US 10,841,495 B2
(45) Date of Patent: Nov. 17, 2020

(54) VEHICLE CAMERA DEVICE AND EXPOSURE PARAMETER SETTING METHOD THEREOF

(71) Applicant: GETAC TECHNOLOGY CORPORATION, Hsinchu County (TW)

(72) Inventor: Wu-Chieh Liao, Taipei (TW)

(73) Assignee: Getac Technology Corporation, Hsinchu County (TW)

(*) Notice: Subject to any disclaimer, the term of this patent is extended or adjusted under 35 U.S.C. 154(b) by 117 days.

(21) Appl. No.: 16/043,524

(22) Filed: Jul. 24, 2018

(65) Prior Publication Data

US 2019/0208100 A1    Jul. 4, 2019

Related U.S. Application Data

(60) Provisional application No. 62/613,335, filed on Jan. 3, 2018.

(51) Int. Cl.
| | |
|---|---|
| *H04N 5/232* | (2006.01) |
| *B60W 10/30* | (2006.01) |
| *H04N 5/235* | (2006.01) |
| *H04N 5/238* | (2006.01) |

(52) U.S. Cl.
CPC .......... *H04N 5/2327* (2013.01); *B60W 10/30* (2013.01); *H04N 5/238* (2013.01); *H04N 5/2352* (2013.01); *H04N 5/2353* (2013.01); *H04N 5/23254* (2013.01); *H04N 5/23258* (2013.01); *B60W 2520/10* (2013.01); *B60W 2554/801* (2020.02)

(58) Field of Classification Search
None
See application file for complete search history.

(56) References Cited

U.S. PATENT DOCUMENTS

| | | | | |
|---|---|---|---|---|
| 6,465,963 | B1* | 10/2002 | Turnbull | B60C 23/061 |
| | | | | 307/10.8 |
| 10,645,294 | B1* | 5/2020 | Manzari | H04M 1/72563 |
| 2009/0244086 | A1* | 10/2009 | Miyasaka | H04N 13/354 |
| | | | | 345/589 |
| 2014/0049973 | A1* | 2/2014 | Adachi | B60Q 11/00 |
| | | | | 362/465 |
| 2015/0042226 | A1* | 2/2015 | Hibino | B60Q 1/1423 |
| | | | | 315/82 |
| 2017/0101056 | A1* | 4/2017 | Park | B60R 1/00 |
| 2017/0144587 | A1* | 5/2017 | Ogawa | B60Q 1/143 |
| 2017/0225691 | A1* | 8/2017 | Yamada | B60K 31/00 |

FOREIGN PATENT DOCUMENTS

CN    110611772    *  6/2018

* cited by examiner

*Primary Examiner* — Nancy Bitar

(57) ABSTRACT

A vehicle camera device is suitable to be provided in a first vehicle. The vehicle camera device receives at least one of a vehicle speed value of the first vehicle, a distance value between the first vehicle and a second vehicle, and an afterimage motion amount of an image of the second vehicle, and selects one of a plurality of exposure parameter functions according to at least one of the vehicle speed value of the first vehicle, the distance value and the afterimage motion amount to determine an optimized parameter value.

9 Claims, 3 Drawing Sheets

VEHICLE CAMERA DEVICE AND EXPOSURE PARAMETER SETTING METHOD THEREOF

CROSS-REFERENCE TO RELATED APPLICATIONS

This application claims the benefit of U.S. Application No. 62/613,335, filed on Jan. 3, 2018, the entire disclosure of which is hereby incorporated by reference.

BACKGROUND OF THE INVENTION

Field of the Invention

The invention relates to a camera technology, and more particularly to a vehicle camera device and an exposure parameter setting method thereof.

Description of the Prior Art

Most people rely on vehicles as a transportation means in the daily lives, such that the number of vehicles continues to rise year after year and vehicles have become an indispensable transportation means in the modern world. Due to unpredictable road conditions, most vehicles are equipped with vehicle camera devices for capturing images of road conditions or vehicles ahead.

Vehicle camera devices are currently mainly used for capturing highly dynamic scenes of fast moving vehicles. A common vehicle camera device uses a constant exposure value to capture an image. However, using a constant exposure value to capture a highly dynamic scene causes inadequately low brightness in an image or blurred image of a moving vehicle, in a way that information of a vehicle plate cannot be recognized.

SUMMARY OF THE INVENTION

An exposure parameter setting method of a vehicle camera device is disclosed according to an embodiment of the present invention. The method is suitable to be applied to a first vehicle, and includes: receiving at least one of a vehicle speed value of the first vehicle, a distance value between the first vehicle and a second vehicle, and an afterimage motion amount of an image of the second vehicle; and selecting one of a plurality of exposure parameter functions according to at least one of the vehicle speed value, the distance value and the afterimage motion amount to determine an optimized parameter value.

A vehicle camera device is disclosed according to an embodiment of the present invention. The vehicle camera device is suitable to be applied to a first vehicle, and includes a vehicle distance sensor, a camera module, an image analysis unit and a processing module. The vehicle distance sensor senses a distance value between the first vehicle and a second vehicle. The camera module captures an image of the second vehicle according to an exposure condition. The image analysis unit recognizes the image of the second vehicle to determine an afterimage motion amount of the image of the second vehicle. The processing module selects one of a plurality of exposure parameter functions according to at least one of the vehicle speed value of the first vehicle, the distance value and the afterimage motion amount to determine an optimized parameter value.

In conclusion, the vehicle camera device and the setting method thereof of the embodiments of the present invention are suitable to be applied to a vehicle, and are capable of selecting an appropriate exposure parameter function in response to a vehicle speed of a current vehicle, a distance value of the current vehicle from a front vehicle, and an offset of the front vehicle, so as to select an optimized parameter value according to the selected exposure parameter function.

DETAILED DESCRIPTION OF THE EMBODIMENTS

Figure 1:
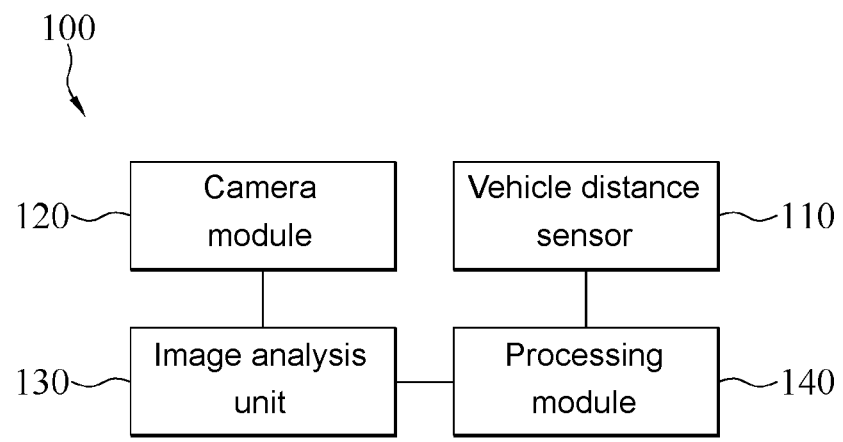
FIG. 1 is a circuit block diagram of a vehicle camera device according to an embodiment of the present invention.
Figure 2:
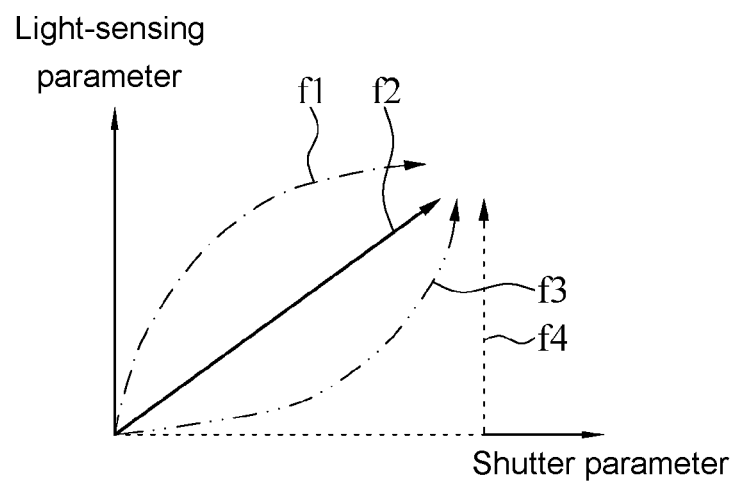
FIG. 2 is a curve diagram of a shutter parameter versus a light-sensing parameter of the present invention.
Figure 3:
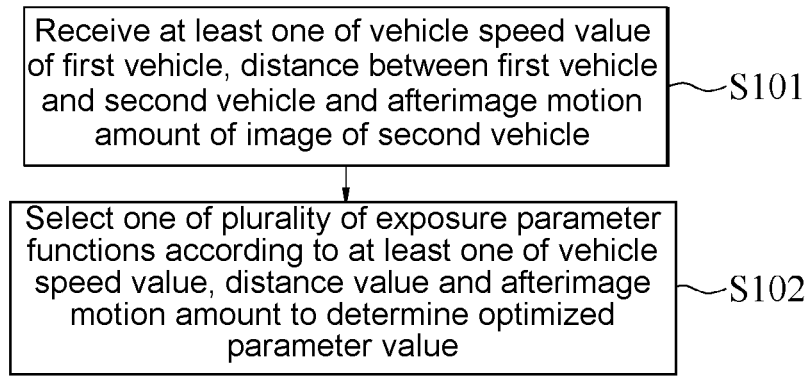
FIG. 3 is a flowchart of a setting method of a vehicle camera device according to an embodiment of the present invention.

FIG. 1 shows a circuit block diagram of a vehicle camera device according to an embodiment of the present invention. FIG. 2 shows a curve diagram of a shutter parameter versus a light-sensing parameter of the present invention. FIG. 3 shows a flowchart of a setting method of a vehicle camera device according to an embodiment of the present invention.

For clear description, ordinal terms such as "first", "second" and "third" are for distinguishing an elements, a region or a part from another identical or similar element, region or part, and are not to be construed as limiting a specific element, region or part.

A vehicle camera device 100 is suitable to be applied in a vehicle (to be referred to as a first vehicle). In some embodiments, the vehicle camera device 100 can be mounted in a first vehicle and capture a scene ahead of the first vehicle, wherein the scene includes a second vehicle located ahead of the first vehicle.

The vehicle camera device 100 includes a vehicle distance sensor 110, a camera module 120, an image analysis unit 130 and a processing module 140. The vehicle distance sensor 110, the camera module 120 and the image analysis unit 130 are individually signally connected to the processing module 140.

The vehicle distance sensor 110 senses a distance value between the first vehicle (a current vehicle) and a second vehicle (a front vehicle). In one embodiment, the vehicle distance sensor 110 senses a relative distance between a vehicle head of the first vehicle and a vehicle tail of the second vehicle. In one embodiment, the vehicle distance sensor 110 may be at least one of an infrared transmitter, an infrared distance sensor and an ultrasonic sensor.

The camera module 120 captures a scene ahead of the first vehicle according to an exposure condition to generate an image of the second vehicle. In one embodiment, the camera module 120 may be a camera lens.

The image analysis unit 130 receives the image of the second vehicle, and performs image recognition on the image of the second vehicle to determine an afterimage motion amount of the image of the second vehicle. The afterimage motion amount refers to an offset of the second vehicle. In one embodiment, the offset is a displacement amount of a progressing direction of the second vehicle relative to the progression direction of the first vehicle. For example, the offset may be a left displacement amount, a right displacement amount, a left-front displacement amount, a right-front displacement amount, a back-left displacement amount or a back-right displacement amount of the progressing direction of the second vehicle relative to the progressing direction of the first vehicle. In one embodiment, the image analysis unit 130 may be an image signal processor chip (ISP).

Referring to FIG. 1 and FIG. 3, the processing module 140 receives at least one of the vehicle speed value of the first vehicle, the distance value between the first vehicle and the second vehicle as sensed and sent from the vehicle distance sensor 110, and the afterimage motion amount from the image analysis unit 130 (step S101), and selects one of a plurality of exposure parameter functions according to at least one of the vehicle speed value, the distance value and the afterimage motion amount to determine an optimized parameter value (step S102). At this point, the processing module 140 may select the exposure parameter function according to all of the vehicle speed value, the distance value and the afterimage motion amount. Alternatively, the processing module 140 may select the exposure parameter function according to any two or any one of the vehicle speed value, the distance value and the afterimage motion amount. In one embodiment, the processing module 140 may be a microprocessor, a microcontroller, a digital signal processor (DSP), a central processing unit (CPU), or any analog and/or digital devices that operate signals on the basis of an operation instruction.

In one embodiment, receiving the afterimage motion amount of the image of the second vehicle in step S101 may be first capturing a scene ahead of the first vehicle according to an exposure condition to generate the image of the second vehicle by the camera module 120, and then performing image recognition on the image of the second vehicle by the image analysis unit 130 to determine the afterimage motion amount.

In one embodiment, the vehicle speed value is from a GPS module or an in-vehicle diagnostic system. In other words, the vehicle camera device 100 may further include a GPS module or an in-vehicle diagnosis system, and the GPS module or the in-vehicle diagnostic system is coupled to the processing module 140.

In one embodiment, the exposure condition may include a shutter parameter and a light-sensing parameter. The exposure parameter functions are a plurality of mapping tables that represent the corresponding relationship between the shutter parameter and the light-sensing parameter, or may be a plurality of predetermined function diagrams that represent the corresponding relationship between the shutter parameter and the light-sensing parameter. In one example, as shown in FIG. 2, when the exposure parameter function is implemented by a predetermined function diagram, these exposure parameter functions may be predetermined function diagrams having different slopes and/or curvatures. Each predetermined function diagram may be at least one of a straight line and a curve. It should be noted that, the quantity of the exposure parameter functions f1 to f4 depicted in FIG. 2 serves only as an example of rather than a limitation to the claim scopes of the present invention. For the plurality of predetermined function diagrams f1 to f4 of the exposure values corresponding to the shutter parameter and the light-sensing parameter, a straight line or a curve having a smaller initial slope is selected if the first vehicle has a slower speed, otherwise a straight line or a curve having a larger initial slope is selected if the first vehicle has a faster speed.

In another embodiment, the exposure condition includes an aperture parameter, a shutter parameter and a light-sensing parameter. At this point, the exposure parameter functions are a plurality of mapping tables that represent the corresponding relationships among the aperture parameter, the shutter parameter and the light-sensing parameter, or a plurality of predetermined function diagrams that represent the corresponding relationships among the aperture parameter, the shutter parameter and the light-sensing parameter by using different slopes and curvatures. The predetermined function diagram may be at least one of a dot, a continuous line segment and discontinuous line segment, wherein the line segment may have various slopes or curvatures.

In one embodiment, the relationship between at least one of the vehicle speed value, the distance value and the afterimage motion amount and the exposure parameter functions may be recorded in a look-up table (LUT). In one embodiment, the LUT may be stored in a storage module of the vehicle camera device 100. In other words, the vehicle camera device 100 may further include a storage module (not shown), which is coupled to the processing module 140.

For example, in a first example, assuming that the processing module 140 selects the corresponding exposure parameter function according to the vehicle speed value, the distance value and the afterimage motion amount in step S102, the LUT then records the corresponding relationships among different vehicle speed values, different distance values, different afterimage amounts and the exposure parameter functions f1 to f4. Further, the processing module 140 identifies the corresponding exposure parameter function from the LUT according to the sensed vehicle speed value, the distance value and the afterimage motion amount.

In a second example, assuming that the processing module 140 selects the corresponding exposure parameter function according to the vehicle speed value in step S102, the LUT then records the corresponding relationship between different vehicle speed values and the exposure parameter functions f1 to f4. Further, the processing module 140 identifies the corresponding exposure parameter function from the LUT according to the sensed vehicle speed value.

In a third example, assuming that the processing module 140 selects the corresponding exposure parameter function according to the distance value in step S102, the LUT then records the corresponding relationship between different distance values and the exposure parameter functions f1 to f4. Further, the processing module 140 identifies the corresponding exposure parameter function from the LUT according to the sensed distance value.

In a fourth example, assuming that the processing module 140 selects the corresponding exposure parameter function according to the afterimage motion amount in step S102, the LUT then records the corresponding relationship between different afterimage motion amounts and the exposure parameter functions f1 to f4. Further, the processing module 140 identifies the corresponding exposure parameter function from the LUT according to the sensed afterimage motion amount.

In a fifth example, assuming that the processing module 140 selects the corresponding exposure parameter function according to the vehicle speed value and the distance value in step S102, the LUT then records the corresponding relationship among different vehicle speed values, different distance values and the exposure parameter functions f1 to f4. Further, the processing module 140 identifies the corresponding exposure parameter function from the LUT according to the sensed vehicle speed value and distance value.

In a sixth example, assuming that the processing module 140 selects the corresponding exposure parameter function according to the distance value and the afterimage motion amount in step S102, the LUT then records the corresponding relationship among different distance values, different afterimage motion amounts and the exposure parameter functions f1 to f4. Further, the processing module 140 identifies the corresponding exposure parameter function from the LUT according to the sensed distance value and afterimage motion amount.

In a seventh example, assuming that the processing module 140 selects the corresponding exposure parameter function according to the vehicle speed value and the afterimage motion amount in step S102, the LUT then records the corresponding relationship among different vehicle speed values, different afterimage motion amounts and the exposure parameter functions f1 to f4. Further, the processing module 140 identifies the corresponding exposure parameter function from the LUT according to the sensed vehicle speed value and afterimage motion amount.

In one embodiment, the processing module 140 may further determine a parameter setting value according to an exposure value of the image of the second vehicle and the selected exposure parameter function, wherein the parameter setting value is the optimized parameter value. Further, the processing module 140 resets the exposure condition of the camera module 120 according to the parameter setting value.

In one embodiment, the vehicle distance sensor 110, the camera module 120, the image analysis unit 130 and the processing unit 140 may be integrated in the same camera device.

In another embodiment, the imaging unit 120, the image analysis unit 130 and the processing unit 140 may be integrated in the same camera device, whereas the vehicle distance sensor 110 may be separately provided in the first vehicle and is signally connected to the camera device.

Figure 4:
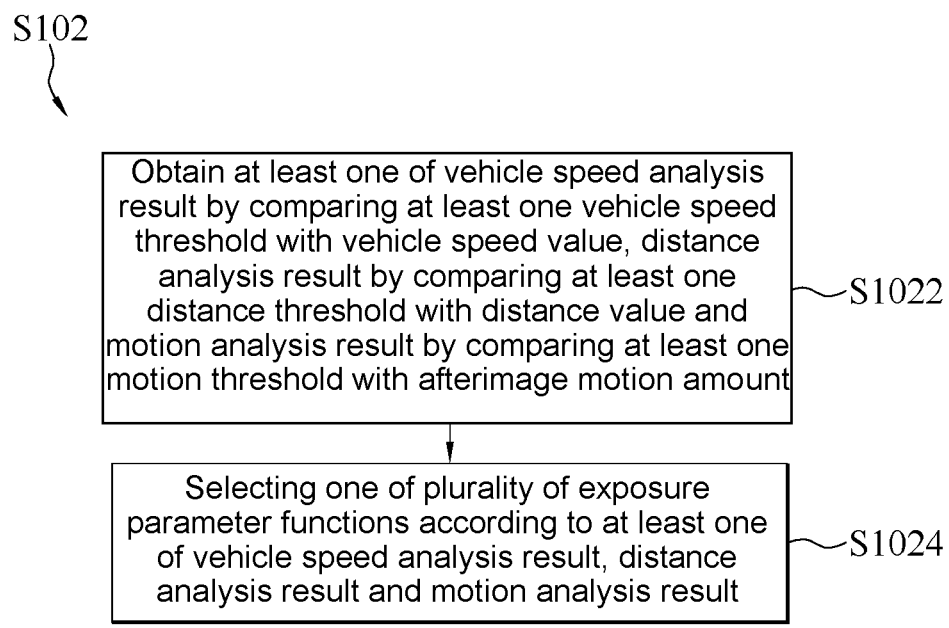
FIG. 4 is a flowchart of step S102 according to an embodiment.

FIG. 4 shows a flowchart of step S102 according to an embodiment. Referring to FIG. 4, in another embodiment, selecting one of the plurality of exposure parameter functions according to at least one of the vehicle speed value, the distance value and the afterimage motion amount (step S102) may include obtaining at least one of a vehicle speed analysis result by comparing at least one vehicle speed threshold with the vehicle speed value, a distance analysis result by comparing at least one distance threshold with the distance value, and a motion analysis result by comparing at least one motion threshold with the afterimage motion amount (step S1022), and selecting one of the plurality of exposure parameter functions according to at least one of the vehicle speed analysis result, the distance analysis result and the motion analysis result (step S1024).

In step S1022, the processing module 140 may compare all of the vehicle speed value, the distance value and the afterimage motion amount with the corresponding thresholds to obtain three analysis results. Alternatively, the processing module 140 may compare any two or any one of the vehicle speed value, the distance value and the afterimage motion amount with the corresponding threshold(s) to obtain two analysis results or one analysis result.

In one embodiment, the vehicle speed threshold may include one or more vehicle speed critical values, e.g., a single vehicle speed critical value, a combination of two vehicle speed critical values, or a combination of three or more vehicle speed critical values. In one embodiment, the vehicle speed threshold includes two vehicle speed critical values, e.g., a first vehicle speed critical value and a second vehicle speed critical value, wherein the first vehicle speed critical value is greater than the second vehicle speed critical value. The vehicle speed analysis result may be a determination result indicating that the vehicle speed value is greater than the first vehicle speed critical value, a determination result indicating that the vehicle speed value is smaller than the second vehicle speed critical value, or a determination result indicating that the vehicle speed value is in an interval between the first vehicle speed critical value and the second vehicle speed critical value.

In one embodiment, the distance threshold may include one or more distance critical values, e.g., one single distance critical value, a combination of two distance critical values, or a combination of three or more distance critical values. In one embodiment, the distance value threshold includes two distance critical values, e.g., a first distance critical value and a second distance critical value, wherein the first distance critical value is greater than the second distance critical value. The distance analysis result may be a determination result indicating that the distance value is greater than the first vehicle speed critical value, a determination result indicating that the speed value is smaller than the second distance critical value, or a determination result indicating that the speed value is in an interval between the first distance critical value and the second distance critical value.

In one embodiment, the motion threshold may include one or more motion critical values, e.g., one single motion critical value, a combination of two motion critical values, or a combination of three or more motion critical values. In one embodiment, the distance threshold includes two motion critical values, e.g., a first motion critical value and a second motion critical value, wherein the first motion critical value is greater than the second motion critical value. The motion analysis result may be a determination result indicating that the afterimage motion amount is greater than the first motion critical value, a determination result indicating that the afterimage motion amount is smaller than the second motion critical value, or a determination result indicating that the afterimage motion amount is in an interval between the first motion critical value and the second motion critical value.

In step S1024, the processing module 140 selects one of the plurality of exposure parameter functions according to at least one of the vehicle speed analysis result, the distance analysis result and the motion analysis result. In one embodiment, at least one of the vehicle speed analysis result, the distance analysis result and the motion analysis result is associated with one of the exposure parameter functions. In another embodiment, the relationship of at least one of the vehicle speed value, the distance value and the afterimage motion amount and the exposure parameter function may be recorded in an LUT.

For example, the processing module 140 selects one of the plurality of exposure parameter functions according to the vehicle speed analysis result. Assume that the vehicle speed threshold includes the first vehicle speed critical value and the second vehicle speed critical value, and the first vehicle speed critical value is greater than the second vehicle speed critical value. Thus, when the vehicle speed analysis result is the determination result indicating that the vehicle speed value is greater than the first vehicle speed critical value, i.e., the first vehicle has a faster speed, the processing module 140 selects the exposure parameter function f1 (a straight line or curve having a larger initial slope) according to the vehicle speed analysis result. When the vehicle speed analysis result is the determination result indicating that the vehicle speed value is smaller than the second vehicle speed critical value, i.e., the first vehicle has a slower speed, the processing module 140 selects the exposure parameter function f4 (a straight line or curve having a smaller initial slope) according to the vehicle speed analysis result.

For another example, the processing module 140 selects one of the plurality of exposure parameter functions according to the vehicle speed analysis result, the distance analysis result and the motion analysis result. Assume that the vehicle speed threshold includes the first vehicle speed critical value and the second vehicle speed critical value, and the first vehicle speed critical value is greater than the second vehicle speed critical value; the distance threshold includes the first distance critical value and the second distance critical value, and the first distance critical value is greater than the second distance critical value; and the motion threshold includes the first motion critical value and the second motion critical value, and the first motion critical value is greater than the second motion critical value. Thus, when the vehicle speed analysis result is the determination result indicating that the vehicle speed value is greater than the first vehicle speed critical value, the distance analysis result is the determination result indicating that the distance value is greater than the first distance critical value, and the motion analysis result is the determination result indicating that the afterimage motion amount is greater than the first motion critical value, the processing module 140 selects the exposure parameter function f1 (a straight line or curve having a larger initial slope) according to the vehicle speed analysis result, the distance analysis result and the motion analysis result. When the vehicle speed analysis result is the determination result indicating that the vehicle speed value is smaller than the second vehicle speed critical value, the distance analysis result is the determination result indicating that the distance value is smaller than the second motion critical value, and the motion analysis result is the determination result indicating that the afterimage motion amount is smaller than the second motion critical value, the processing module 140 selects the exposure parameter function f4 (a straight line or curve having a smaller initial slope) according to the vehicle speed analysis result.

Figure 5:
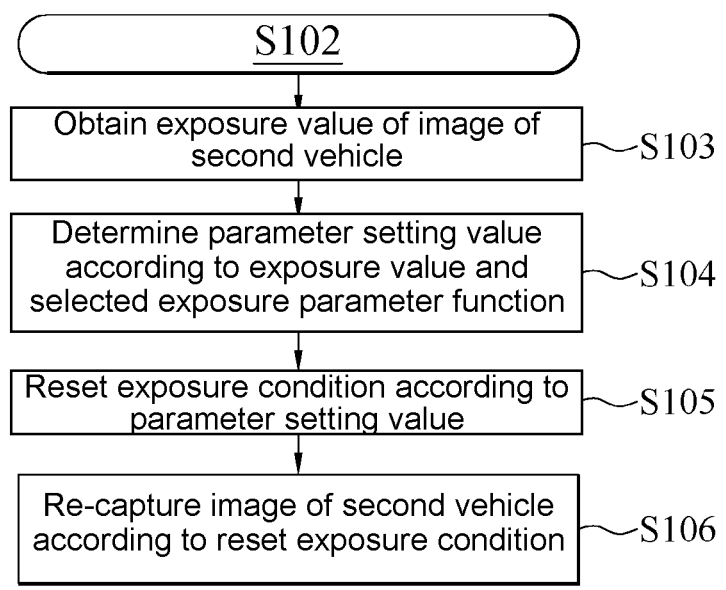
FIG. 5 is a flowchart of setting method of a vehicle camera device according to another embodiment of the present invention.

FIG. 5 shows a flowchart of a setting method of a vehicle camera device according to another embodiment of the present invention. Referring to FIG. 5, in one embodiment, the setting method of a vehicle camera device may further include obtaining an exposure value of the image of the second vehicle (step S103), determining a parameter setting value according to the exposure value and the selected exposure parameter function (step S104), resetting the exposure condition according to the parameter setting value (step S105), and re-capturing the image of the second vehicle according to the reset exposure condition (step S106). Steps S101 and S102 are substantially identical to those describe above, and associated details are omitted herein.

In step S103, in one embodiment, the vehicle camera device 100 performs light detection on the scene to obtain the exposure value of the image of the second vehicle. For example, in the light detection, the processing module 140 causes the camera module 120 to capture an image of the scene to obtain a driving vehicle image, and the image analysis unit 130 then receives and analyzes the driving vehicle image to obtain the exposure value. In one example, the image analysis unit 130 may perform a calculation on the basis of brightness of all pixels in the driving vehicle image to obtain the exposure value. In another embodiment, the image analysis unit 130 can identify an image of the second vehicle from the driving vehicle image, and calculate the exposure value on the basis of the brightness of the pixels of the image of the second vehicle.

In step S104, the processing module 140 determines, according to the exposure value and the selected exposure parameter function, a parameter setting value as the optimized parameter value.

In one embodiment, the processing module 140 may determine the parameter setting value through an algorithm.

In one embodiment, as shown in FIG. 2, when the exposure condition includes the shutter parameter and the light-sensing parameter, and these exposure parameter functions are a plurality of predetermined function diagrams representing the corresponding relationships between the shutter parameter and the light-sensing parameter by using different slopes and curvatures, the processing module 140 identifies, according to the selected exposure parameter function and the exposure value, the corresponding shutter parameter and the corresponding light-sensing parameter as the parameter setting value. That is to say, the parameter setting value is a shutter parameter and a light-sensing parameter corresponding to a specific point in the selected exposure parameter function (e.g., one of the exposure parameter functions f1 to f4 shown in FIG. 2).

In another embodiment, when the exposure condition includes the aperture parameter, the shutter parameter and the light-sensing parameter, and these exposure parameter functions are the plurality of predetermined function diagrams that represent the corresponding relationship among the aperture parameter, the shutter parameter and the light-sensing parameter by using different slopes and curvatures, the processing module 140 identifies, according to the selected exposure parameter function and the exposure value, the corresponding shutter parameter, the corresponding aperture parameter and the corresponding light-sensing parameter as the parameter setting value. That is to say, the parameter setting value is an aperture parameter, a shutter parameter and a light-sensing parameter corresponding to a specific point in the selected exposure parameter function.

In one embodiment of step S105, the processing module 140 resets the exposure condition of the camera module 120 according to the parameter setting value.

In one embodiment of step S106, the camera module 120 re-captures the image of the second vehicle according to the reset exposure condition.

In conclusion, the vehicle camera device and the setting method thereof according to the embodiments of the present invention are suitable to be applied to a vehicle, and are capable of selecting an appropriate exposure parameter function in response to a vehicle speed of the current vehicle, a distance of the current vehicle from a front vehicle, and an offset of the front vehicle, so as to determine an optimized parameter value.

While the invention has been described by way of example and in terms of the preferred embodiments, it is to be understood that the invention is not limited thereto. Various modifications and similar arrangements made by a person skilled in the art without departing from the spirit of the present invention are to be encompassed within the scope of the present invention. The scope of the present invention therefore should be accorded with the broadest interpretation of the appended claims.

What is claimed is:

1. An exposure parameter setting method of a vehicle camera device, suitable for a first vehicle, the exposure parameter setting method of a vehicle camera device comprising:

obtaining an exposure value according to a driving vehicle image of a second vehicle, which comprises the image of the second vehicle; receiving an afterimage motion amount of the image of the second vehicle by capturing a scene according to an original exposure condition to generate the driving vehicle image; performing image recognition on the driving vehicle image to obtain the afterimage motion amount of the image of the second vehicle; determining a displacement amount of the second vehicle relative to the progression direction of the first vehicle of a progressing direction; receiving at least one of a vehicle speed value of the first vehicle, a distance value between the first vehicle and the second vehicle and the afterimage motion amount of the image of the second vehicle;

selecting one of a plurality of exposure parameter functions according to at least one of the vehicle speed value, the distance value and the afterimage motion amount; determining an optimized parameter value according to the selected exposure parameter function and the exposure value; and setting an exposure condition of the vehicle camera device according to the optimized parameter value.

2. The exposure parameter setting method of a vehicle camera device according to claim 1, wherein the step of selecting one of the plurality of exposure parameter functions according to at least one of the vehicle speed value, the distance value and the afterimage motion amount comprises:

obtaining at least one of a vehicle speed analysis result by comparing at least one vehicle speed threshold with the vehicle speed value, a distance analysis result by comparing at least one distance threshold with the distance value, and a motion analysis result by comparing at least one motion threshold with the afterimage motion amount; and selecting one of the plurality of exposure parameter functions according to at least one of the vehicle speed analysis result, the distance analysis result and the motion analysis result.

3. The exposure parameter setting method of a vehicle camera device according to claim 1, further comprising: re-capturing the scene to generate the driving vehicle image according to the exposure condition.

4. The exposure parameter setting method of a vehicle camera device according to claim 3, wherein the exposure condition comprises a shutter parameter and a light-sensing parameter; the exposure parameter functions are a plurality of mapping tables that represent a corresponding relationship between the shutter parameter and the light-sensing parameter, or a plurality of predetermined function diagrams that represent the corresponding relationship between the shutter parameter and the light-sensing parameter by using different slopes and curvatures; the step of determining the parameter setting value according to the exposure value and the selected exposure parameter function comprises:

identifying the corresponding shutter parameter and the corresponding light-sensing parameter according to the selected exposure parameter function and the exposure value.

5. The exposure parameter setting method of a vehicle camera device according to claim 3, wherein the exposure condition comprises an aperture parameter, a shutter parameter and a light-sensing parameter; the exposure parameter functions are a plurality of mapping tables that represent a corresponding relationship among the aperture parameter, the shutter parameter and the light-sensing parameter, or a plurality of predetermined function diagrams that represent the aperture parameter, the shutter parameter and the light-sensing parameter by using different slopes and curvatures; the step of determining the parameter setting value according to the exposure value and the selected exposure parameter function comprises:

identifying the corresponding aperture parameter, the corresponding shutter parameter and the corresponding light-sensing parameter according to the selected exposure parameter function and the exposure value.

6. A vehicle camera device, suitable to be applied to a first vehicle, the vehicle camera device comprising: a vehicle distance sensor, configured to sense a distance value between the first vehicle and a second vehicle; a camera module, configured to capture an image of the second vehicle according to an exposure condition;

an image analysis unit, configured to recognize the image of the second vehicle to determine an afterimage motion amount of the image of the second vehicle;

a processing module, configured to control the camera module to capture a scene according to an original exposure condition to generate a driving vehicle image, which comprises the image of the second vehicle;

wherein the image analysis unit is configured to perform image recognition on the driving vehicle image to obtain the afterimage motion amount of the image of the second vehicle by determining a displacement amount of the second vehicle relative to the progression direction of the first vehicle of a progressing direction; and wherein the processing module is further configured to obtain an exposure value according to the image of the second vehicle, select one of a plurality of exposure parameter functions according to at least one of the vehicle speed value of the first vehicle, the distance value and the afterimage notion amount, determine an optimized parameter value according to the selected exposure parameter function and the exposure value, and set an exposure condition of the vehicle camera device according to the optimized parameter value.

7. The vehicle camera device according to claim 6, wherein the exposure condition comprises an aperture parameter, a shutter parameter and a light-sensing parameter, and the exposure parameter functions are a plurality of mapping tables of exposure values corresponding to the shutter parameter and the light-sensing parameter or a plurality of predetermined function diagrams of different slopes and curvatures.

8. The vehicle camera device according to claim 6, wherein the exposure condition comprises an aperture parameter, a shutter parameter and a light-sensing parameter, and the exposure parameter functions are a plurality of mapping tables of exposure values corresponding to the aperture parameter and the light-sensing parameter or a plurality of predetermined function diagrams of different slopes and curvatures.

9. The vehicle camera device according to claim 6, wherein the vehicle speed value is from a GPS module or an in-vehicle diagnostic system.

* * * * *